(12) United States Patent
Onishi

(10) Patent No.: US 10,879,737 B2
(45) Date of Patent: Dec. 29, 2020

(54) CONTROL DEVICE, POWER RECEIVING DEVICE, AND ELECTRONIC DEVICE

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 35 days.

(21) Appl. No.: 16/367,756

(22) Filed: Mar. 28, 2019

(65) Prior Publication Data
US 2019/0305593 A1 Oct. 3, 2019

(30) Foreign Application Priority Data

Mar. 29, 2018 (JP) .................. 2018-064296

(51) Int. Cl.
*H02J 50/10* (2016.01)
*H02J 7/02* (2016.01)
*H04R 25/00* (2006.01)

(52) U.S. Cl.
CPC .............. *H02J 50/10* (2016.02); *H02J 7/025* (2013.01); *H04R 25/554* (2013.01)

(58) Field of Classification Search
CPC .......... H02J 7/025; H02J 50/10; H04R 25/554
USPC ....................................................... 307/104
See application file for complete search history.

(56) References Cited

U.S. PATENT DOCUMENTS

| | | | | |
|---|---|---|---|---|
| 2014/0361888 A1* | 12/2014 | Huang | ..................... | G08B 5/36 340/539.1 |
| 2015/0043741 A1 | 2/2015 | Shin | | |
| 2016/0196834 A1 | 7/2016 | Shin | | |
| 2016/0198253 A1 | 7/2016 | Shin | | |
| 2017/0054309 A1* | 2/2017 | Toya | ................... | H02J 7/00036 |
| 2020/0179695 A1* | 6/2020 | Bergh | ................ | A61N 1/36031 |

FOREIGN PATENT DOCUMENTS

JP  2014-042213 A  3/2014
JP  2017-216712 A  12/2017

* cited by examiner

*Primary Examiner* — William Hernandez
(74) *Attorney, Agent, or Firm* — Oliff PLC

(57) ABSTRACT

The control device includes a charging-system circuit and a discharging-system circuit. The discharging-system circuit has a discharging-system control circuit, and a power supply circuit that performs power supply to a processing device. The discharging-system control circuit performs a first control that, when the power supply is in an off state, when motion of the power receiving device is detected by a motion sensor, switches the power supply to an on state based on a detection signal from the motion sensor, and a second control that switches the power supply between the on state on the off state based on a control signal. The discharging-system control circuit, in the first control, disables the second control when motion of the power receiving device has been detected by the motion sensor.

20 Claims, 10 Drawing Sheets

CONTROL DEVICE, POWER RECEIVING DEVICE, AND ELECTRONIC DEVICE

CROSS REFERENCE

This application claims benefit of Japanese Application JP 2018-064296, filed on Mar. 29, 2018. The disclosure of the prior application is hereby incorporated by reference herein in its entirety.

BACKGROUND

1. Technical Field

The present invention relates to a control device, a power receiving device, an electronic device, and the like.

2. Related Art

An acceleration sensor, a gyro sensor, and the like are known as motion sensors that detect a motion applied to the sensor. For example, a motion sensor is incorporated into an electronic device, and control of the electronic device is performed based on a detection signal from the motion sensor. For example, JP-A-2014-42213 discloses a hearing aid device including a motion sensor that detects an operation of a hearing aid device or an accessory of the hearing aid device, and a control unit that executes repeat playback when a predetermined operation has been detected by the motion sensor.

Also, in recent years, contactless power transmission that utilizes electromagnetic induction and enables power transmission without contact of metal portions has been in the spotlight. An example application of this contactless power transmission is charging of an electronic device incorporating a secondary battery, such as a household appliance or a mobile terminal, for example.

In an electronic device in which a secondary battery is incorporated as described above, it is desirable to save power by switching off power to the electronic device when not using the electronic device. For example, it is assumed that a user switches the electronic device on and off by operating a switch provided in the electronic device. On the other hand, to increase convenience, a technique of switching on the electronic device by using a motion sensor is conceivable. For example, it is conceivable that when the user lifts the electronic device, for example, motion is detected with a motion sensor and the electronic device is switched from off to on.

However, when the electronic device is switched on and off by a plurality of mechanisms, there is a possibility that control by these mechanisms will interfere, resulting in an operation not intended by the user. For example, there is a risk that when the user attempts to switch on the electronic device by operating the switch, the electronic device is switched on by the detection signal of the motion sensor before being switched on by the switch operation, and so the switch operation ultimately causes the electronic device to switch from on to off. In this case, although the user is attempting to switch on the electronic device, operation results in switching off the electronic device, which is not the operation intended by the user.

SUMMARY

One aspect of the invention relates to a control device that controls a power receiving device that receives electric power supplied from a power transmission device by contactless power transmission, the control device including: a charging-system circuit that receives electric power supplied from the power transmission device, and charges a charging subject based on the received electric power; and a discharging-system circuit having a discharging-system control circuit that operates based on electric power from the charging subject, and a power supply circuit that performs power supply to a processing device based on electric power from the charging subject. The discharging-system control circuit performs a first control that, when the power supply is in an off state, when motion of the power receiving device is detected by a motion sensor that detects motion of the power receiving device, switches the power supply to an on state based on a detection signal from the motion sensor, and performs a second control of switching the power supply between the on state and the off state based on a first control signal that controls switching of the power supply between the on state and the off state. The discharging-system control circuit, in the first control, disables the second control when motion of the power receiving device has been detected by the motion sensor.

Also, in one aspect of the invention, a configuration may be adopted in which the discharging-system circuit has a monitoring circuit that monitors an operation state of a switch unit, and outputs a monitoring result as the first control signal. In this aspect of the invention, the discharging-system control circuit, in the second control, when the power supply is in the off state, when the monitoring circuit detects operation of the switch unit, switches the power supply to the on state based on the first control signal, and when the power supply is in the on state, when the monitoring circuit detects operation of the switch unit, switches the power supply to the off state based on the first control signal.

Also, in one aspect of the invention, a configuration may be adopted in which the discharging-system control circuit performs a third control that maintains the power supply in the off state based on a second control signal that maintains the power supply in the off state, and in the third control, the discharging-system control circuit disables the first control even if motion of the power receiving device has been detected by the motion sensor.

Also, in one aspect of the invention, a configuration may be adopted in which the control device further includes a voltage detection circuit. In this aspect of the invention, the power supply circuit, where VBAT represents a voltage of the charging subject and k is a real number that satisfies $0<k<1$, outputs a voltage of k×VBAT from an output node to the processing device, the voltage detection circuit, where VOUT represents a voltage of the output node and p is a real number that satisfies $p>1$, detects whether or not VOUT>p× k×VBAT is satisfied, and outputs a detection result as the second control signal, and the discharging-system control circuit, in the third control, when the voltage detection circuit detects that VOUT>p×k×VBAT is satisfied, switches the power supply from the on state to the off state based on the second control signal, and maintains the off state.

Also, in one aspect of the invention, a configuration may be adopted in which the discharging-system control circuit performs a fourth control that, when the charging-system circuit is charging the charging subject, sets the power supply to the off state, and in the fourth control, the discharging-system control circuit disables the first control even if motion of the power receiving device has been detected by the motion sensor.

Also, in one aspect of the invention, a configuration may be adopted in which the discharging-system control circuit performs a fifth control that, when the charging-system circuit is performing removal detection that detects whether the power receiving device has been removed from the power transmission device, sets the power supply to the off state, and in the fifth control, the discharging-system control circuit disables the first control even if motion of the power receiving device has been detected by the motion sensor.

Also, in one aspect of the invention, a configuration may be adopted in which the discharging-system control circuit performs a sixth control that, when the charging-system circuit detects removal after a predetermined period has passed after the power receiving device is removed from the power transmission device, switches the power supply to the on state. In the sixth control, when motion of the power receiving device has been detected by the motion sensor during the predetermined period, the discharging-system control circuit switches the power supply to the on state by the first control even if the predetermined period has not passed.

Also, in one aspect of the invention, a configuration may be adopted in which the control device includes an interface circuit that receives a power off command that sets the power supply to the off state from the processing device. In this aspect of the invention, the discharging-system circuit has a monitoring circuit that monitors an operation state of a switch unit, and outputs a monitoring result as the first control signal. The discharging-system control circuit performs a seventh control that switches the power supply from the on state to the off state when the interface circuit receives the power off command, and if performing the processing of the second control, the discharging-system control circuit stops that processing and enables the seventh control.

Also, another aspect of the invention relates to a power receiving device including any control device described above.

Also, still another aspect of the invention relates to an electronic device including any control device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes exemplary embodiments of the invention. Note that the embodiments described below do not unreasonably limit the scope of the invention described in the claims, and not all of the configurations described in these embodiments are necessary to solve problems addressed by the invention.

Figure 1:
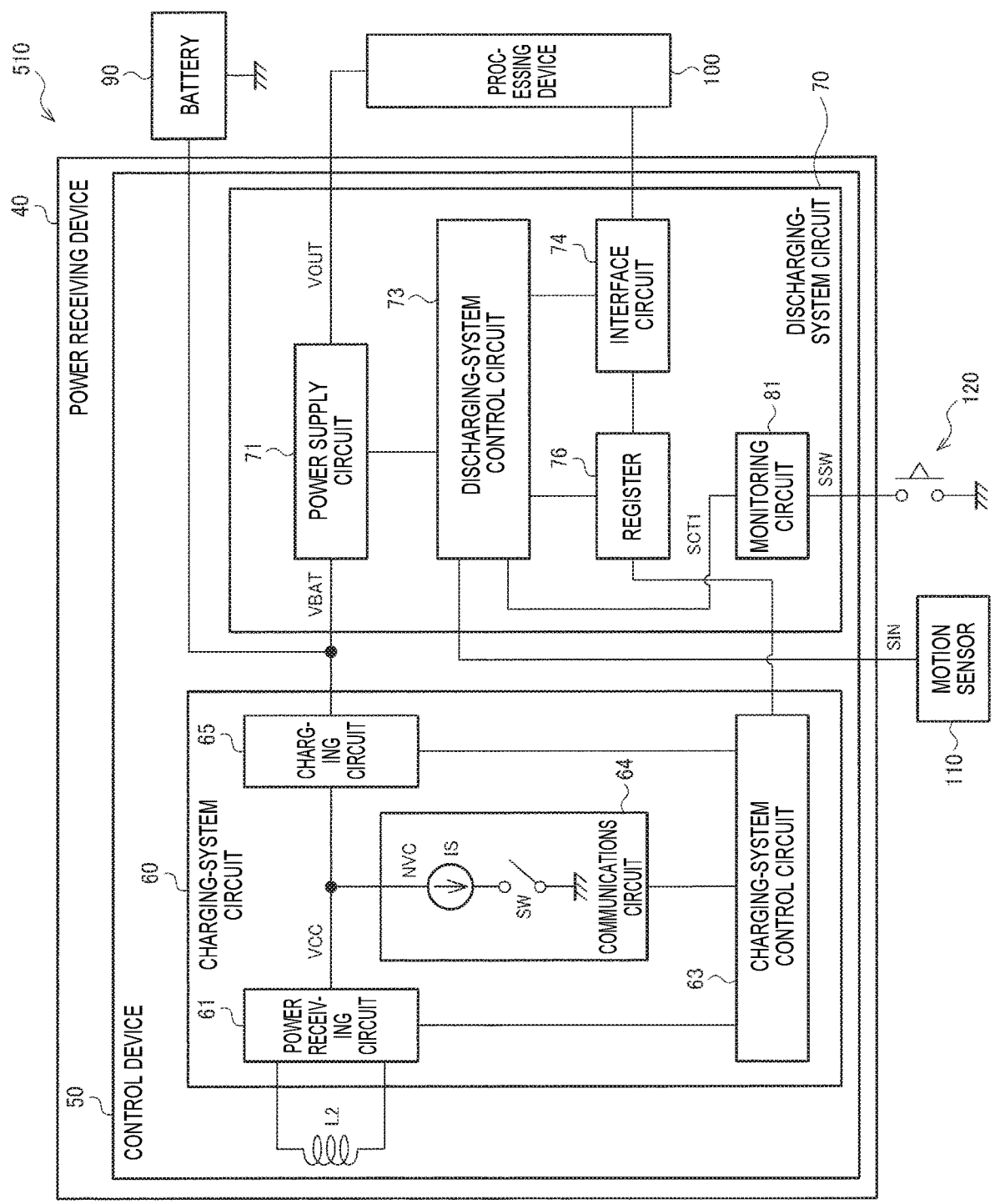
FIG. 1 shows a first configuration example of an electronic device on a power receiving side, a power receiving device, and a control device on the power receiving side, in a contactless power transmission system.

1. Electronic Device, Power Receiving Device, and Control Device on Power Receiving Side FIG. 1 shows a first configuration example of an electronic device 510 on a power receiving side, a power receiving device 40, and a control device 50 on the power receiving side, in a contactless power transmission system. Note that regarding operation of each part in contactless power transmission, only the main points will be explained here, and a detailed description will be given later. Following is mainly a description of power supply control performed by the power receiving device 40.

The electronic device 510 includes a battery 90 subject to charging, the power receiving device 40, a processing device 100, a motion sensor 110, and a switch unit 120. The power receiving device 40 includes the control device 50 and a secondary coil L2.

The control device 50 receives electric power transmitted from a power transmission device of the contactless power transmission system and charges the battery 90 with that electric power. Also, the control device 50 controls power supply from the battery 90 to the power receiving device 40 and the processing device 100. The control device 50 is, for example, an integrated circuit device. The control device 50 includes a charging-system circuit 60 and a discharging-system circuit 70.

The charging-system circuit 60 is a circuit operated by electric power received by a power receiving circuit 61. The charging-system circuit 60 includes the power receiving circuit 61, a charging-system control circuit 63, a communications circuit 64, and a charging circuit 65.

The power receiving circuit 61 receives electric power from a power transmission device 10 and outputs a rectified voltage VCC. The charging-system control circuit 63 controls each part of the charging-system circuit 60, and executes various control processing performed during charging of the battery 90. The communications circuit 64 performs load modulation for sending communications data to the power transmission device. The charging circuit 65 charges the battery 90 based on the rectified voltage VCC. A battery voltage VBAT is the voltage of a positive electrode of the battery 90.

The discharging-system circuit 70 is a circuit operated by electric power supplied from the battery 90. The discharging-system circuit 70 includes a power supply circuit 71, a discharging-system control circuit 73, an interface circuit 74, a register 76, and a monitoring circuit 81.

The power supply circuit 71 converts the battery voltage VBAT to an output voltage VOUT and supplies that output voltage VOUT to the processing device 100. The discharging-system control circuit 73 controls each part of the discharging-system circuit 70, and executes various control processing performed during discharging of the battery 90. The interface circuit 74 performs communications between the processing device 100 and the control device 50. The register 76 stores status information of the control device 50, setting information, and the like. For example, the charging-system control circuit 63 and the discharging-system control circuit 73 access the register 76. Also, the processing device 100 accesses the register 76 through the interface circuit 74.

The monitoring circuit 81 monitors the operation state of the switch unit 120 and outputs the monitoring result as a control signal SCT1. Specifically, the monitoring circuit 81 detects operation that switches the power supply to the processing device 100 between an on state and an off state. When the switch unit 120 is operated, a ground level signal SSW is input to the monitoring circuit 81, and the monitoring circuit 81 activates the control signal SCT1 when the signal SSW is at the ground level for a predetermined period. For example, the monitoring circuit 81 is a counter that counts the period in which the signal SSW is at the ground level. The switch unit 120 is, for example, a push button-type switch. Note that the monitoring circuit 81 may be included in the discharging-system control circuit 73.

The motion sensor 110 is a sensor that detects motion of the electronic device 510 including the power receiving device 40. Specifically, the motion sensor 110 is a sensor that converts a physical quantity caused by motion into an electric signal. For example, the motion sensor 110 is an acceleration sensor that detects acceleration, a gyro sensor that detects angular velocity, or the like. Note that in this embodiment, a case where the motion sensor 110 is an acceleration sensor will be described as an example, but this is not a limitation. The motion sensor 110 activates a detection signal SIN when the detected acceleration changes.

The discharging-system control circuit 73 controls the power supply circuit 71 based on the control signal SCT1 from the monitoring circuit 81 and the detection signal SIN from the motion sensor 110. That is, the discharging-system control circuit 73 switches the power supply to the off state when the control signal SCT1 becomes active with the power supply in the on state, and switches the power supply to the on state when the control signal SCT1 becomes active with the power supply in the off state. Also, the discharging-system control circuit 73 switches the power supply to the on state when the detection signal SIN becomes active with the power supply in the off state. Control by the detection signal SIN is not performed when the power supply is in the on state.

Here, the on state is a state in which the power supply circuit 71 is supplying power to the processing device 100 by outputting the output voltage VOUT to the processing device 100. That is, in this state the power supply circuit 71 is operating. The off state is a state in which the power supply circuit 71 is not outputting the output voltage VOUT to the processing device 100, and power supply to the processing device 100 is stopped. That is, in this state the power supply circuit 71 is not operating. For example, the power supply circuit 71 includes a charge pump circuit that converts the battery voltage VBAT to the output voltage VOUT. In this case, the on state is a state in which a switching operation of the charge pump circuit is being performed, and the off state is a state in which the switching operation of the charge pump circuit is stopped.

The battery 90 is, for example, a chargeable secondary battery, and is a lithium battery, a nickel battery, or the like, for example. The lithium battery is a lithium ion secondary battery, a lithium ion polymer secondary battery, or the like. The nickel battery is a nickel-hydrogen storage battery, a nickel-cadmium storage battery, or the like.

The processing device 100 is provided in an electronic device incorporating the power receiving device 40, and is a power supply target to which electric power is supplied from the battery 90. The processing device 100 is, for example, an integrated circuit device or the like, and is, for example, a processor such as a DSP, a microprocessor, a microcontroller, or a CPU.

In the above configuration, there exists power supply control by the switch unit 120 and power supply control by the motion sensor 110. It is possible for the plurality of these power supply controls to be performed at the same time, and a state switched by one power supply control can be canceled by the other power supply control. For example, it is assumed that when the electronic device 510 was removed from a case or lifted from a desk, a user attempted to power on the electronic device 510 by a switch operation. At this time, the motion sensor 110 detects motion due to the electronic device 510 being moved, so the power supply is switched to the on state. Because the switch operation alternatingly switches between the on state and the off state, the power supply, which has been switched to the on state by the motion sensor 110, is returned to the off state again by the switch operation. The intention of the user was to power on the electronic device 510, so this power off operation was unintended by the user.

Regarding this point, in this embodiment, interference of the power supply control can be prevented by performing the following sort of control.

That is, the discharging-system control circuit 73, when the power supply is in the off state, when motion of the power receiving device 40 is detected by the motion sensor 110 that detects motion of the power receiving device 40, switches the power supply to the on state based on the detection signal SIN from the motion sensor 110. This control is called a first control. Also, the discharging-system control circuit 73 switches the power supply between the on state and the off state based on the control signal SCT1 (a first control signal) that controls switching of the power supply between the on state and the off state. This control is called a second control. At this time, the discharging-system control circuit 73, in the first control, disables the second control when motion of the power receiving device 40 has been detected by the motion sensor 110. That is, the discharging-system control circuit 73 disables switching to the off state by the control signal SCT1 when motion of the power receiving device 40 has been detected by the motion sensor 110.

According to this embodiment, when the electronic device 510 incorporating the power receiving device 40 moves, the motion sensor 110 detects motion and power supply to the processing device 100 is started, and the electronic device 510 is powered on. At this time, even if the switch unit 120 is operated, the motion sensor 110 is detecting motion, so switching to the on state by the control signal SCT1 is disabled. Therefore, the electronic device 510 once switched on is maintained in the on state by the detection of motion, and is not returned to the off state by operation of the switch unit 120. The user is attempting to power on the electronic device 510 by operating the switch unit 120, and according to this embodiment, the operation intended by the user is realized.

Also, in this embodiment, the discharging-system control circuit 73, in the second control, switches the power supply to the on state based on the control signal SCT1 when the monitoring circuit 81 detects operation of the switch unit 120 with the power supply in the off state. Also, the discharging-system control circuit 73, in the second control, switches the power supply to the off state based on the control signal SCT1 when the monitoring circuit 81 detects operation of the switch unit 120 with the power supply in the on state.

According to this embodiment, by operation of the switch unit 120, it is possible to control both switching of the power supply from the on state to the off state, and switching of the power supply from the off state to the on state. In a case where, in this way, it is possible to alternatingly switch power on and off by the same mechanism, a situation can arise in which, although the user is attempting to power on the electronic device 510 by operating the switch unit 120, the electronic device 510 is actually powered off due to interference by another control mechanism such as the motion sensor 110. According to this embodiment, this sort of interference between control mechanisms can be prevented.

Figure 2:
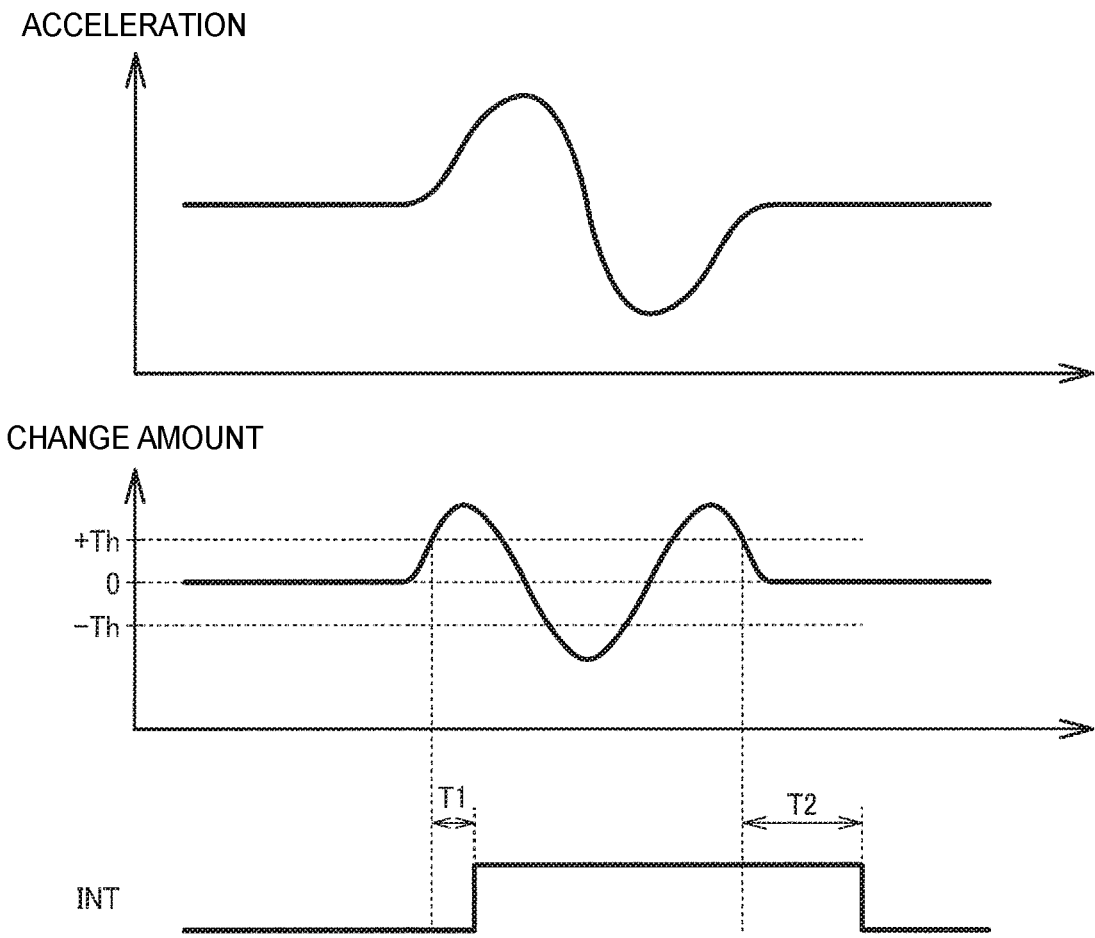
FIG. 2 shows an operation example of a motion sensor.
Figure 3:
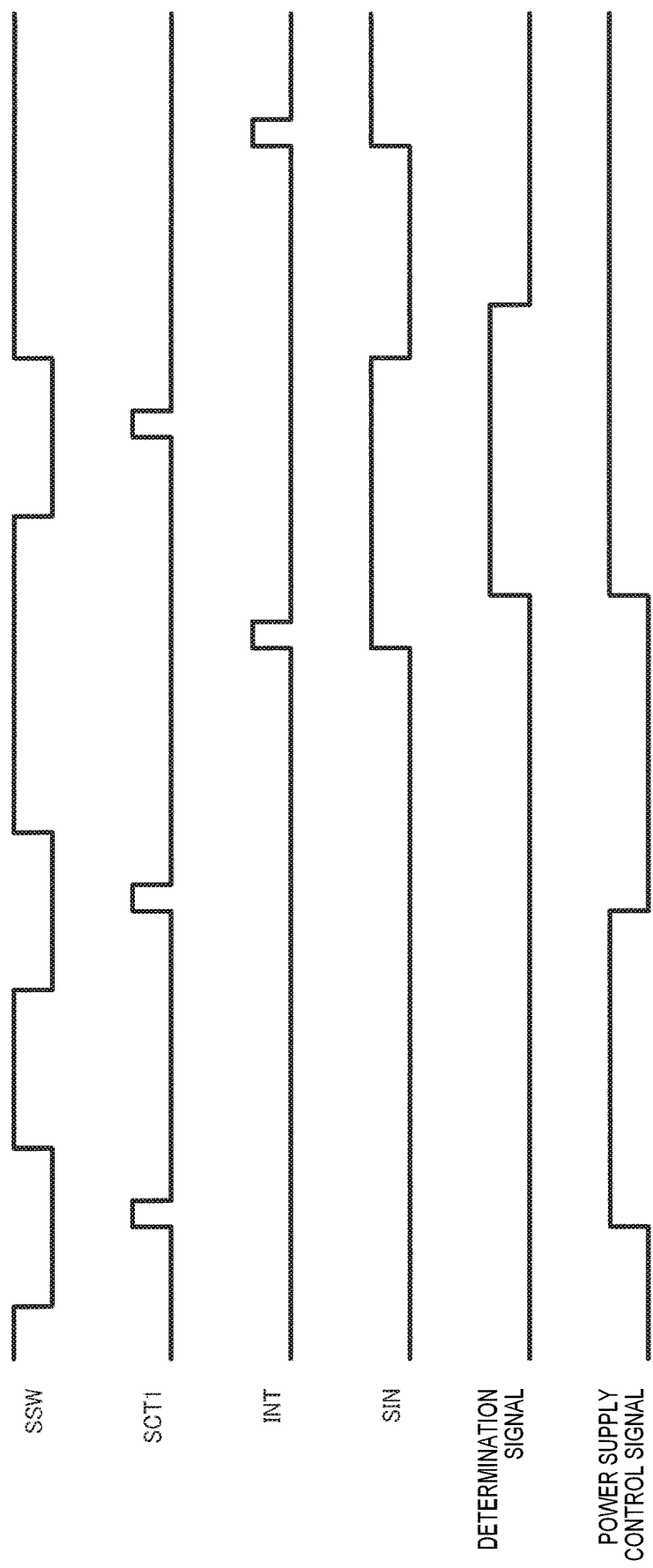
FIG. 3 is a timing chart illustrating a first operation example of the control device.

Following is a detailed description of operation of the motion sensor 110 and the control device 50 in FIG. 1, with reference to FIGS. 2 and 3.

FIG. 2 shows an operation example of the motion sensor 110. The motion sensor 110 detects acceleration applied to the motion sensor 110 and obtains a change amount of the acceleration. The change amount of the acceleration corresponds to a differential value of the detected acceleration. The acceleration does not change when the electronic device 510 incorporating the motion sensor 110 is stopped, so the change amount is zero, and when the electronic device 510 is moved, the acceleration changes and the change amount also changes. The motion sensor 110 compares the absolute value of the change amount with a threshold value Th, and changes a signal INT from a low level signal to a high level signal when a time T1 has passed since the absolute value of the change amount exceeded the threshold value Th. Also, the motion sensor 110 changes the signal INT from a high level signal to a low level signal when a time T2 has passed since the absolute value of the change amount dropped below the threshold value Th. The signal INT is an internal signal of the motion sensor 110.

Note that in FIG. 2, T1>0 and T2>0, but either one of times T1 and T2 may be zero, and both times T1 and T2 may be zero. Also, note that a low level signal is a first logic level in a broad sense and a high level signal is a second logic level in a broad sense.

FIG. 3 is a timing chart illustrating a first operation example of the control device 50. When the switch unit 120 is operated, the signal SSW becomes a low level signal. The monitoring circuit 81 activates the control signal SCT1 after a predetermined time passes from the falling edge of the signal SSW. In FIG. 3, the high level of each signal indicates active. The discharging-system control circuit 73 inverts the logic level of the power supply control signal when the control signal SCT1 becomes active. When the power supply control signal is a low level signal, the power supply is in the off state, and when the power supply control signal is a high level signal, the power supply is in the on state. In this way, the on state and the off state of the power supply are switched by operation of the switch unit 120.

When the signal INT changes from a low level signal to a high level signal, the motion sensor 110 starts a count by a counter from that edge, and sets the detection signal SIN to a high level signal until reaching a predetermined count value. The discharging-system control circuit 73 samples the detection signal SIN with a clock signal, and changes a determination signal from a low level signal to a high level signal when the high level signal is continuously sampled for a predetermined number of clocks. Also, when a low level signal is continuously sampled for a predetermined number of clocks, the determination signal is changed from a high level signal to a low level signal. By adopting this approach, there are unlikely to be effects due to noise of the detection signal SIN. The discharging-system control circuit 73 changes the power supply control signal from a low level signal to a high level signal when the determination signal becomes a high level signal. The determination signal is an internal signal of the discharging-system control circuit 73. When the power supply control signal is a high level signal, the determination signal is not set to a high level signal even if the detection signal SIN becomes a high level signal.

In a period when the detection signal SIN is a high level signal, the discharging-system control circuit 73 does not change the power supply control signal to a low level signal if the control signal SCT1 is active. In this way, when motion has been detected by the motion sensor 110, the power supply control by the control signal SCT1 is disabled, and the power supply is in the on state regardless of operation of the switch unit 120.

Figure 4:
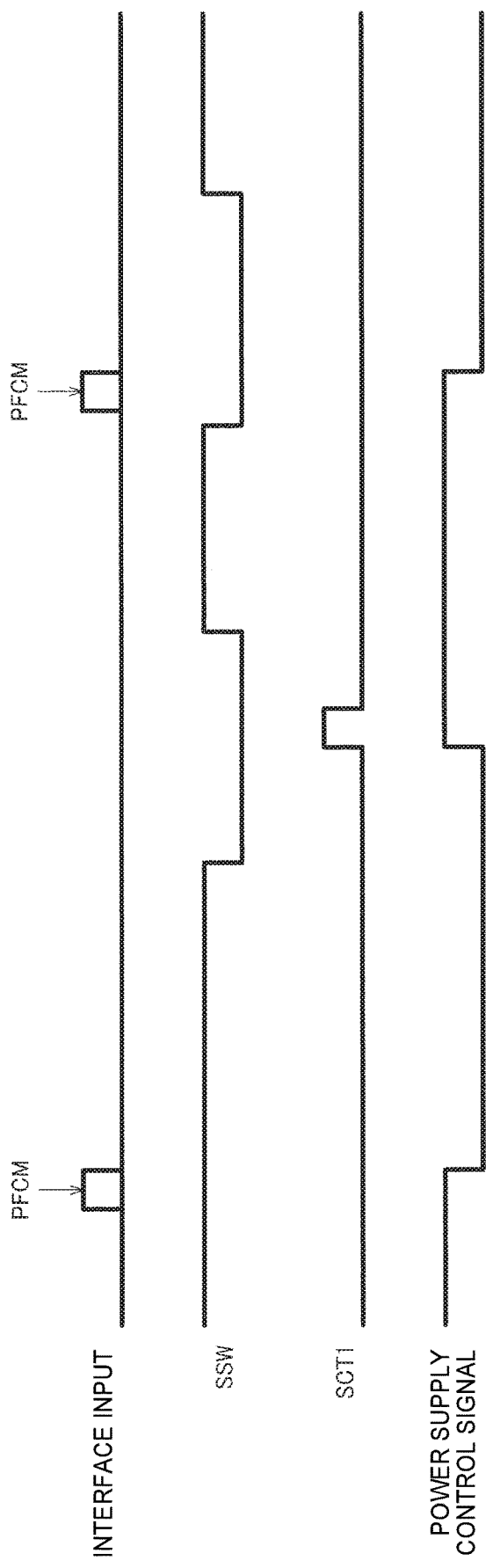
FIG. 4 is a timing chart illustrating a second operation example of the control device.

FIG. 4 is a timing chart illustrating a second operation example of the control device 50. In this operation example, a power off command PFCM is sent from the processing device 100 to the control device 50, and the power supply from the power supply circuit 71 to the processing device 100 is set to the off state.

As shown in FIG. 4, when the power supply from the power supply circuit 71 is in the on state, when the interface circuit 74 receives the power off command PFCM from the processing device 100, the discharging-system control circuit 73 changes the power supply control signal from a high level signal to a low level signal and sets the power supply to the off state. This control is called a seventh control.

When the switch unit 120 is operated with the power supply in the off state, the monitoring circuit 81 activates the control signal SCT1, and the discharging-system control circuit 73 changes the power supply control signal from a low level signal to a high level signal, and sets the power supply to the on state. This control is the second control described above.

Here, it is assumed that the power supply is in the on state, the switch unit 120 is operated, and also the interface circuit 74 has received the power off command PFCM from the processing device 100. In a case where the discharging-system control circuit 73 is performing the processing of the second control, the discharging-system control circuit 73 stops that processing and activates the seventh control. Specifically, the processing of the second control is processing in which the monitoring unit 81 determines the operation of the switch unit 120. That is, the 'period of performing the processing of the second control' refers to a predetermined period after the switch unit 120 is operated and the signal SSW becomes a low level signal, until the monitor unit 81 activates the control signal SCT1. When the power off command PFCM is received during this predetermined period, the discharging-system control circuit 73 changes the power supply control signal from a high level signal to a low level signal, and the monitoring unit 81 stops processing to determine the operation of the switch unit 120. That is, in this case, the control signal SCT1 does not become active even if the predetermined period passes after the switch unit 120 is operated and the signal SSW becomes a low level signal.

If the power supply control by the switch unit 120 and the power supply control by the power off command PFCM are performed at the same time, there is a risk that these controls will interfere with each other, resulting in an operation unintended by the user. That is, when the user attempts to power on the electronic device by a switch operation, it is assumed that the electronic device has been powered off by the power off command PFCM. Because switch operation alternatingly switches between the on state and the off state, the power supply, which has been set to the off state by the power off command PFCM, is returned to the on state again by the switch operation. The intention of the user was to power off the electronic device, so this power on operation was unintended by the user. According to this embodiment, if the power off command PFCM has been received within a predetermined period after the switch unit 120 is operated and the signal SSW becomes a low level signal, until the monitor unit 81 activates the control signal SCT1, the second control is disabled by the switch unit 120. Therefore, only the seventh control by the power off command PFCM is enabled, and the power supply switches from the on state to the off state. Thus, according to this embodiment it is possible to prevent interference between control mechanisms.

2. Second Configuration Example

Figure 5:
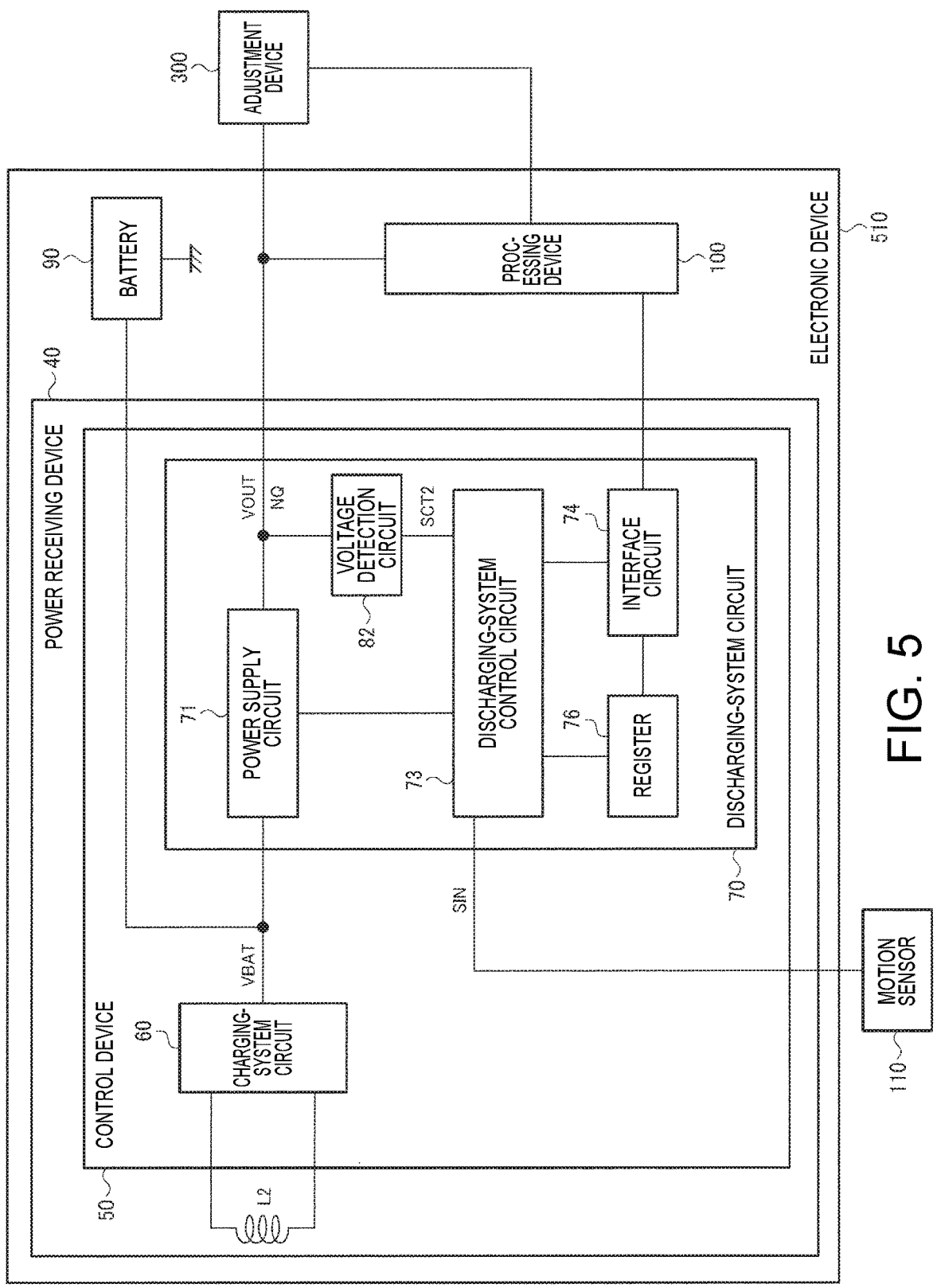
FIG. 5 shows a second configuration example of the electronic device on the power receiving side, the power receiving device, and the control device on the power receiving side, in the contactless power transmission system.

FIG. 5 shows a second configuration example of the electronic device 510 on the power receiving side, the power receiving device 40, and the control device 50 on the power receiving side, in the contactless power transmission system. Note that the same reference signs are assigned to the same constituent elements as the constituent elements described with reference to FIG. 1, and a description of those constituent elements is omitted as appropriate.

In FIG. 5, the discharging-system circuit 70 includes a voltage detection circuit 82. The voltage detection circuit 82 is a circuit that detects that an adjustment device 300 is connected to the control device 50.

The adjustment device 300 is a device for adjusting the characteristics of the electronic device 510. For example, when the electronic device 510 is a hearing aid device, the adjustment device 300 is connected to the electronic device 510, audio amplification frequency characteristics or the like are adjusted, and that adjustment value is set in the processing device 100. At this time, operation of the power supply circuit 71 is in the off state, and the adjustment device 300 supplies power to a power supply node of the processing device 100. That is, the power supply voltage of the processing device 100 is supplied from the adjustment device 300 to an output node NQ of the power supply circuit 71.

When the voltage detection circuit 82 detects that the power supply voltage from the adjustment device 300 has been supplied to the output node NQ of the power supply circuit 71, the voltage detection circuit 82 outputs that detection result as a control signal SCT2 (a second control signal). The discharging-system control circuit 73 sets the power supply to the off state based on the control signal SCT2, and maintains the power supply in the off state while the power supply voltage from the adjustment device 300 is being supplied to the output node NQ of the power supply circuit 71. This control is called a third control. At this time, the discharging-system control circuit 73, in the third control, disables the first control even if motion of the power receiving device 40 has been detected by the motion sensor 110. The first control is switching control to switch the power supply to the on state according to the detection signal SIN from motion sensor 110.

When a voltage from an external source is being input to the output node NQ of the power supply circuit 71, operation of the power supply circuit 71 may possibly adversely affect the battery 90. For example, the power supply circuit 71 converts the battery voltage VBAT to the output voltage VOUT by the charge pump circuit. When the charge pump circuit is operating, if a voltage higher than the output voltage VOUT is supplied from an external source, a voltage higher than the battery voltage VBAT is output to an input side of the charge pump circuit. The battery 90 is charged by this voltage, but this charging current is not controlled, so there is a risk that the charging current will become an overcurrent, or that the battery 90 will be overcharged. According to this embodiment, when a voltage is being input from an external source to the output node NQ of the power supply circuit 71, operation of the power supply circuit 71 is maintained in the off state, so the battery 90 can be protected.

Figure 6:
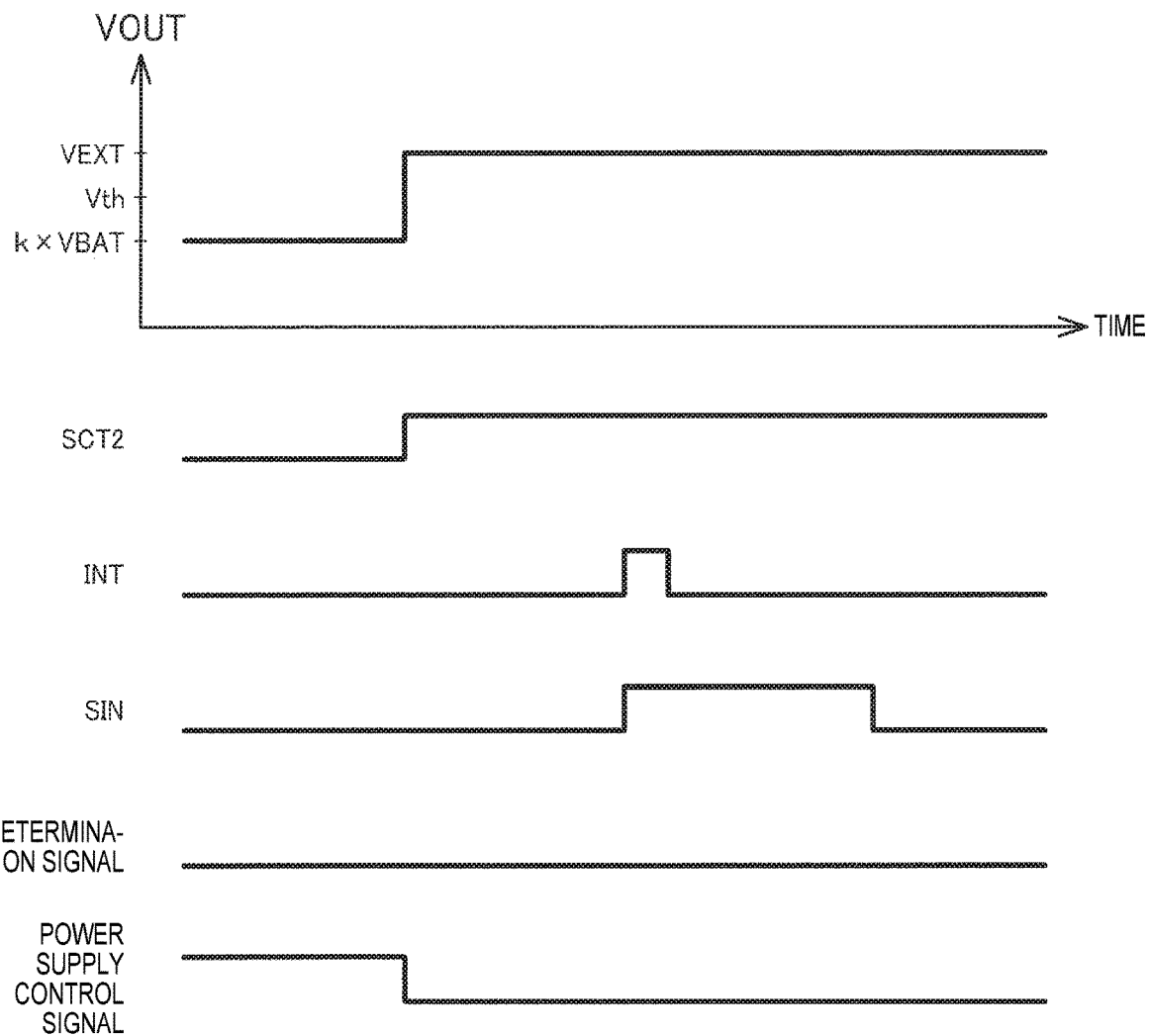
FIG. 6 is a timing chart illustrating a third operation example of the control device.

FIG. 6 is a timing chart illustrating a third operation example of the control device 50. When the power supply to the processing device 100 is in the on state, the power supply circuit 71 outputs VOUT=k×VBAT to the output node NQ. Here, k is a real number satisfying 0<k<1, and is a step-down ratio when the charge pump circuit steps down the battery voltage VBAT. Where n and m are integers of 1 or more and satisfying n<m, k=n/m.

When the adjustment device 300 is connected to the electronic device 510, the adjustment device 300 supplies a power supply voltage VEXT to the output node NQ, and VEXT>k×VBAT. The voltage detection circuit 82 includes a comparator, and the comparator compares the voltage VOUT of the output node NQ with a threshold voltage Vth=p×k×VBAT, and outputs the comparison result as the control signal SCT2. Here, p is a real number satisfying p>1. The comparator sets the control signal SCT2 to a high level signal when VOUT>p×k×VBAT.

The discharging-system control circuit 73 switches the power supply from the on state to the off state when the control signal SCT2 changes from the low level signal to the high level signal, that is, when the voltage detection circuit detects VOUT>p×k×VBAT. While the control signal SCT2 is a high level signal, the discharging-system control circuit 73 disables the detection signal SIN from the motion sensor 110. That is, even if motion is detected and the detection signal SIN becomes a high level signal, the determination signal is not set to a high level signal.

According to this embodiment, while detecting that the power supply voltage VEXT has been supplied from the adjustment device 300 to the output node NQ of the power supply circuit 71, the discharging-system control circuit 73 maintains the power supply in the off state, and does not set the power supply to the on state even if the motion sensor 110 has detected motion. Therefore, in a state where the charge pump circuit, which outputs k×VBAT, is operating, VEXT>k×VBAT is not applied to the output node NQ, so the battery 90 can be protected.

3. Contactless Power Transmission System

Figure 7:
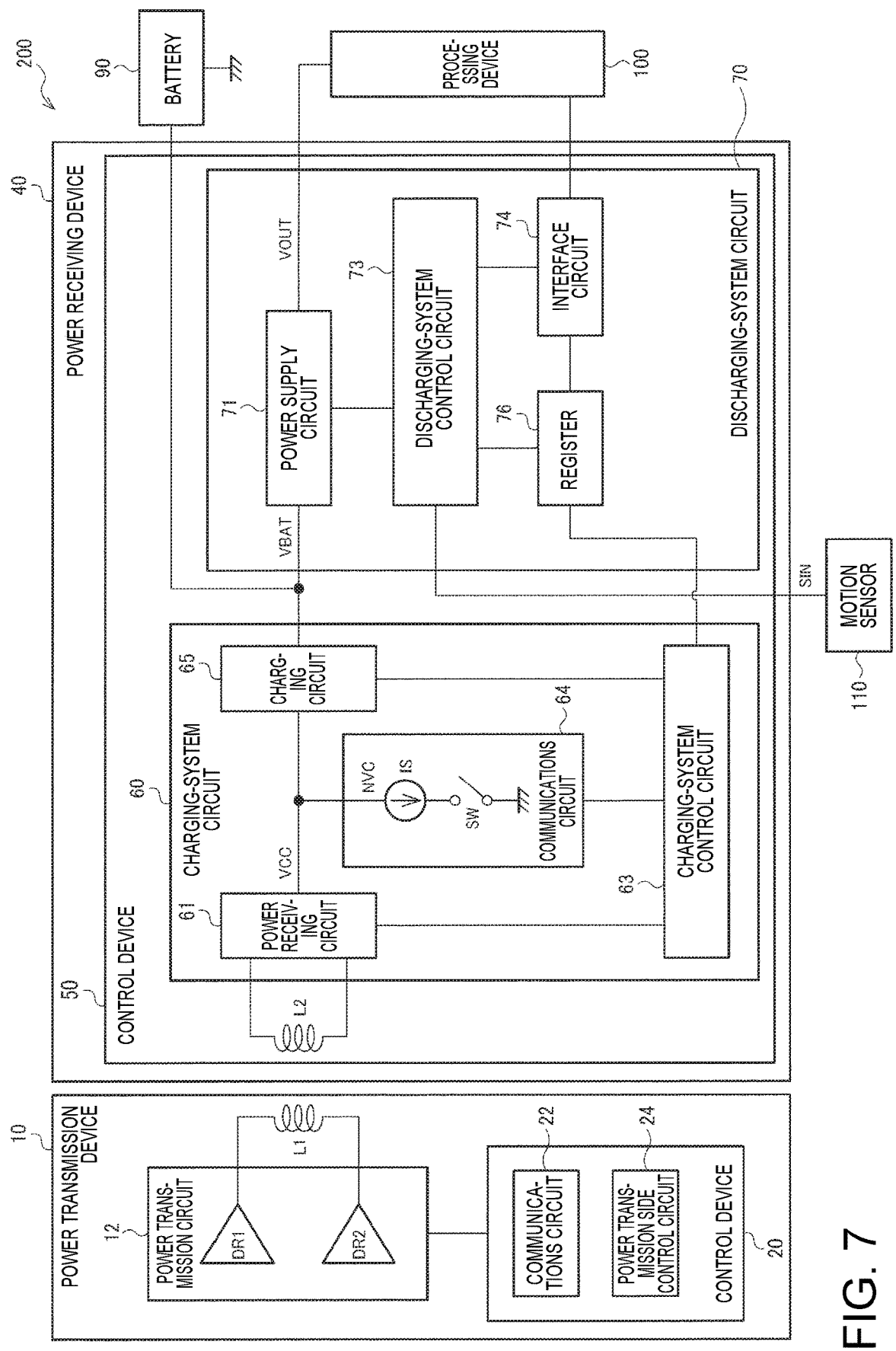
FIG. 7 shows a configuration example of the contactless power transmission system.

FIG. 7 shows a configuration example of a contactless power transmission system 200. Also, FIG. 7 shows a third configuration example of the power receiving device 40 and the control device 50 on the power receiving side, and a configuration example of the power transmission device 10 and a control device 20 on the power transmission side.

The electronic device on the power transmission side in the contactless power transmission system is, for example, a charger. The electronic device on the power transmission side includes the power transmission device 10. The electronic device on the power receiving side in the contactless power transmission system includes the power receiving device 40, the battery 90, the processing device 100, and the motion sensor 110. The contactless power transmission system 200 of this embodiment is configured with the power transmission device 10 and the power receiving device 40.

As the electronic device of the power receiving side, various electronic devices can be assumed, such as a hearing aid, a wrist watch, a biological information measuring device, a portable information terminal, a cordless telephone device, a shaver, an electric toothbrush, a wrist computer, a hand-held terminal, an electric automobile, or an electric bicycle. A biological information measuring device can be assumed to be a wearable device to be used worn on a human body. Also, the portable information terminal is, for example, a smartphone, a mobile telephone, a head-mounted display, or the like.

The power transmission device 10 includes a primary coil L1, a power transmission circuit 12, and the control device 20. The power transmission device 10 is also referred to as a primary side device or a primary side module. The control device 20 is, for example, an integrated circuit device.

The power transmission circuit 12 generates an alternating current voltage of a predetermined frequency during power transmission and supplies this to the primary coil L1. The power transmission circuit 12 includes a power transmission driver DR1 that drives one end of the primary coil L1 and a power transmission driver DR2 that drives the other end of the primary coil L1. Each of the power transmission drivers DR1 and DR2 is a buffer circuit constituted by, for example, a power MOS transistor. Power is transmitted from the primary coil L1 to a secondary coil L2 by the drivers DR1 and DR2 applying alternating current voltage to the primary coil L1.

The primary coil L1 is electromagnetically coupled with the secondary coil L2 to form a power transmission transformer. For example, when power transmission is required, the electronic device on the power receiving side is placed on the charger, establishing a state such that the magnetic flux of the primary coil L1 passes through the secondary coil L2. This is referred to as the docked state, and changing from the removed state to the docked state is called docking. On the other hand, when power transmission is unnecessary, the charger and the electronic device on the power receiving side are physically separated from each other, such that the magnetic flux of the primary coil L1 does not pass through the secondary coil L2. This is called the removed state, and changing from the docked state to the removed state is called removal.

The control device 20 performs various control on the power transmission side. The control device 20 includes a communications circuit 22 and a power transmission side control circuit 24.

The communications circuit 22 performs communications processing between the power transmission device 10 and the power receiving device 40. That is, the communications circuit 22 receives communications data from the power receiving device 40 to the power transmission device 10, and sends communications data from the power transmission device 10 to the power receiving device 40. Communications data is exchanged through a power transmission path. Specifically, when the power receiving device 40 performs load modulation, the amount of current that flows through the primary coil L1 changes, and thus the current that flows to the power supply of the power transmission drivers DR1 and DR2 changes. The communications circuit 22 includes a current-voltage conversion circuit that converts the current into a voltage, and a comparator that compares that voltage with a reference voltage. The power transmission side control circuit 24 acquires communications data based on an output signal of the comparator. Also, the communications circuit 22 changes the driving frequency at which the power transmission circuit 12 drives the primary coil L1 based on the communications data. By detecting this frequency change on the power receiving side, communications data is sent from the power transmission device 10 to the power receiving device 40.

The power transmission side control circuit 24 controls various processing performed by the control device 20. That is, the power transmission side control circuit 24 controls power transmission by the power transmission circuit 12, and controls communications processing by the communications circuit 22. The power transmission side control circuit 24 is configured with a logic circuit.

The power receiving device 40 includes the secondary coil L2 and the control device 50. The power receiving device 40 is also referred to as a secondary side device or a secondary side module. The control device 50 is, for example, an integrated circuit device.

The control device 50 performs various control on the power receiving side. The control device 50 includes a charging-system circuit 60 and a discharging-system circuit 70.

The charging-system circuit 60 is a circuit operated by electric power received by a power receiving circuit 61, and operates while the power receiving circuit 61 is receiving power and during charging of the battery 90. That is, each part of the charging-system circuit 60 operates based on a rectified voltage VCC, or based on a voltage obtained by regulating the rectified voltage VCC. The charging-system circuit 60 receives electric power supplied from the power transmission device 10 and charges the battery 90 based on the received electric power. The charging-system circuit 60 includes the power receiving circuit 61, a charging-system control circuit 63, a communications circuit 64, and a charging circuit 65.

The discharging-system circuit 70 is a circuit operated by power supplied from the battery 90, and performs power supply to the processing apparatus 100 based on electric power from the battery 90. Each part of the discharging-system circuit 70 operates based on a battery voltage VBAT. The discharging-system circuit 70 includes a power supply circuit 71, a discharging-system control circuit 73, an interface circuit 74, and a register 76.

The power receiving circuit 61 receives electric power from the power transmission device 10. Specifically, the power receiving circuit 61 converts alternating current induced voltage of the secondary coil L2 into the direct current rectified voltage VCC. This conversion is performed by a rectifying circuit of the power receiving circuit 61. The rectifying circuit can be realized by, for example, a plurality of transistors, diodes, and the like.

The charging-system control circuit 63 controls the power receiving circuit 61, the communications circuit 64, and the charging circuit 65, and executes various control processing performed during charging of the battery 90. Also, the charging-system control circuit 63 performs receiving processing to receive communications data sent from the power transmission device 10. The power receiving circuit 61 has a comparator that converts the alternating current induced voltage of the secondary coil L2 into a rectangular wave signal. As described above, the power transmission device 10 changes the frequency of the alternating current voltage that drives the primary coil L1 based on communications data. The charging-system circuit 60 measures the frequency of the rectangular wave signal using a counter or the like, for example, and receives communications data based on a result of that measurement. The charging-system control circuit 63 can be realized by various processors such as a logic circuit generated by an automatic placement and routing method such as a gate array, or a DSP (Digital Signal Processor), for example.

The communications circuit 64 performs load modulation for sending communications data to the power transmission device 10. Note that the communications circuit 64 is also referred to as a load modulation circuit. The communications circuit 64 has a current source IS and a switch SW. The current source IS allows a constant current to flow from a node NVC of the rectified voltage VCC to a ground node. The switch SW is configured with a transistor. The current source IS and the switch SW are provided in series between the node NVC of the rectified voltage VCC and the ground node. Based on the control signal from the charging-system control circuit 63, the switch SW is turned on or off to turn on or off the constant current that flows from the node NVC to the ground node. The control signal is a signal corresponding to communications data. The load seen from the power transmission circuit 12 differs between when the constant current is on and when the constant current is off. Communications from the power receiving device 40 to the power transmission device 10 are realized by the communications circuit 22 on the power transmission side detecting this load difference with the technique described above.

The charging circuit 65 performs charging and control of the battery 90. The charging circuit 65 charges the battery 90 based on the electric power received by the power receiving circuit 61. That is, the charging circuit 65 charges the battery 90 by generating a constant current based on the rectified voltage VCC and supplying the constant current to the terminal of the battery 90.

The power supply circuit 71 performs discharging operation of the battery 90, and supplies electric power from the battery 90 to the processing device 100. The power supply circuit 71 can be configured with, for example, a charge pump circuit or a linear regulator.

The discharging-system control circuit 73 executes various control processing performed during discharging of the battery 90. The discharging-system control circuit 73 performs control of the power supply circuit 71 and the interface circuit 74. The detection signal SIN from the motion sensor 110 is input to the discharging-system control circuit 73, and the discharging-system control circuit 73 switches the power supply from the off state to the on state when the motion sensor 110 detects motion. Also, as will be described later, power supply control is performed according to the status of docking detection, removal detection, and the like. The discharging-system control circuit 73 can be realized by various processors such as a logic circuit generated by an automatic placement and routing method such as a gate array, or a DSP, for example.

The interface circuit 74 is an interface used for sending and receiving information between the processing device 100 and the control device 50. The information sent or received is, for example, data, a command, or the like. As the interface circuit 74, circuits of various interface systems can be adopted, and it is possible to adopt, for example, an interface circuit of an SPI (Serial Peripheral Interface) system or an I2C (Inter Integrated Circuit) system.

Figure 8:
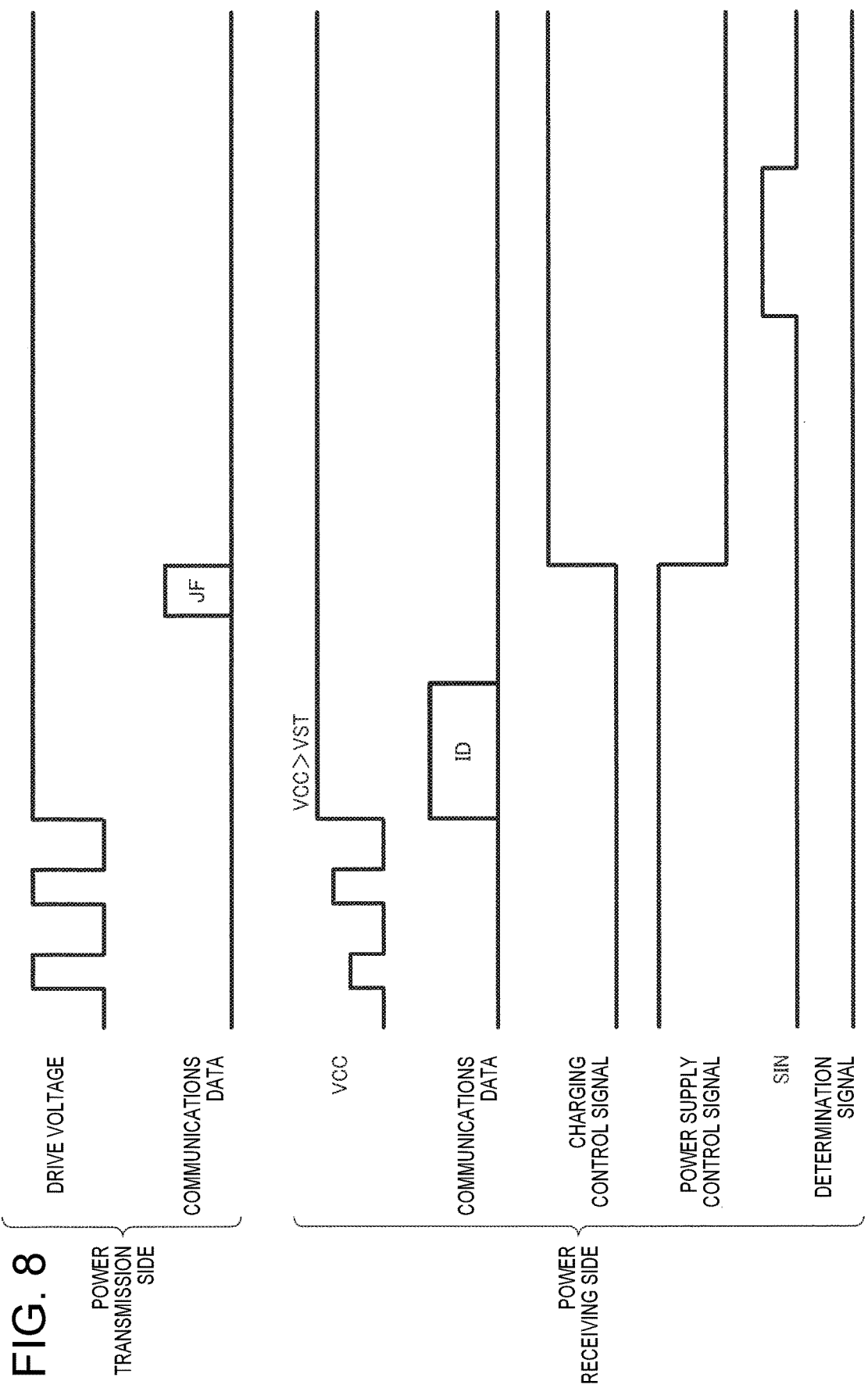
FIG. 8 is a timing chart illustrating a first operation example of the contactless power transmission system.

FIG. 8 is a timing chart illustrating a first operation example of the contactless power transmission system 200.

A drive voltage is the amplitude of the alternating current voltage at which the power transmission circuit 12 drives the primary coil L1. When the power receiving device 40 is not docked to the power transmission device 10, the power transmission device 10 and the power receiving device 40 are performing docking detection. At this time, the power transmission circuit 12 is intermittently driving the primary coil L1. In order to dock the power receiving device 40 to the power transmission device 10, as the primary coil L1 and the secondary coil L2 approach each other, the rectified voltage VCC output by the power receiving circuit 61 rises. The rectified voltage VCC is generated intermittently as the power transmission circuit 12 intermittently transmits power.

The charging-system circuit 60 has an A/D conversion circuit that performs A/D conversion of the rectified voltage VCC, and the charging-system control circuit 63 causes the communications circuit 64 to begin load modulation when the rectified voltage VCC exceeds a determination voltage. This determination voltage VST is a voltage for determining whether or not the power receiving device 40 is in a state docked to the power transmission device 10. When the communications circuit 22 of the power transmission device 10 detects load modulation, the power transmission side control circuit 24 causes the power transmission circuit 12 to start continuous power transmission. The charging-system control circuit 63 causes an authentication information ID to be sent to the power transmission device 10 by load modulation. The authentication information ID is information for allowing the control device 20 on the power transmission side to authenticate the control device 50 on the power receiving side, and is, for example, identification data. The power transmission side control circuit 24 performs authentication processing of the authentication information ID, and when the control device 50 of the power receiving side has been authenticated, the power transmission side control circuit 24 causes a charging start notification JF to be sent from the communications circuit 22 to the power receiving device 40. Note that the charging-system control circuit 63 may repeatedly send the authentication information ID, and the power transmission side control circuit 24 may send the charging start notification JF when reception of the authentication information ID has been confirmed a plurality of times.

When the charging start notification JF is received, the charging-system control circuit 63 switches the charging control signal from a low level signal to a high level signal. The charging circuit 65 charges the battery 90 when the charging control signal is a high level signal. Also, when the charging start notification JF is received, the charging-system control circuit 63 writes that information in the register 76. When the information that the charging start notification JF has been received is written in the register 76, the discharging-system control circuit 73 switches the power supply control signal from a high level signal to a low level signal. The power supply circuit 71 stops power supply to the processing device 100 when the power supply control signal is a low level signal.

In this way, the discharging-system control circuit 73 sets the power supply to the off state when the charging-system circuit 60 is charging the battery 90. This control is called a fourth control. The discharging-system control circuit 73, in the fourth control, disables the first control even if motion of the power receiving device 40 has been detected by the motion sensor 110. The first control is switching control to switch the power supply to the on state based on the detection signal SIN from motion sensor 110. Specifically, when the charging control signal is a high level signal, the discharging-system control circuit 73 does not set the determination signal to a high level signal even if the detection signal SIN becomes a high level signal, and maintains the power supply control signal at a low level signal.

According to this embodiment, in a state where it is not necessary to operate the electronic device, the electronic device can be maintained in the off state even when the motion sensor 110 detects motion. While the electronic device is set in the charger and the battery 90 of the electronic device is being charged, the electronic device is not in use. Also, if the power supply from the battery 90 is powered on during charging, the charging time will be lengthened. Therefore, during charging of the battery 90, the power supply is maintained in the off state even when the motion sensor 110 detects motion.

Figure 9:
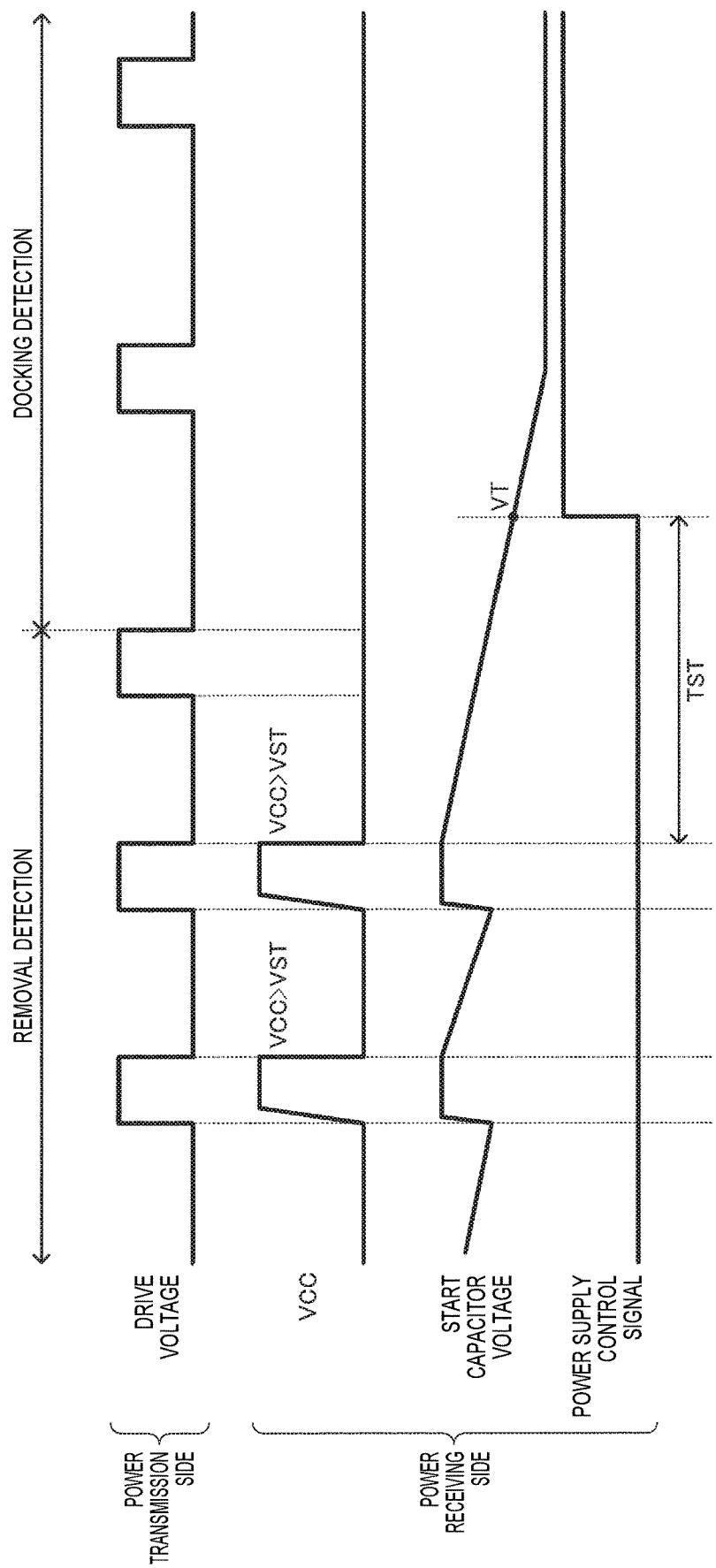
FIG. 9 is a timing chart illustrating a second operation example of the contactless power transmission system.

FIG. 9 is a timing chart illustrating a second operation example of the contactless power transmission system 200.

After charging of the battery 90 is completed with the electronic receiving device on the power receiving side set in the charger, the contactless power transmission system 200 shifts to a removal detection state, and the power receiving device 40 detects whether or not the power receiving device 40 has been removed from the power transmission device 10.

The power receiving device 40 includes an unshown start capacitor, and one end of the start capacitor is connected to one end of a switch and one end of a resistor, and the other end of the start capacitor is connected to a ground node. The start capacitor is, for example, an external component of the control device 50. The switch is a transistor, and the other end of the switch is connected to a node of the rectified voltage VCC. The other end of the resistor is connected to a ground node.

In the removal detection, the power transmission device 10 intermittently transmits power, and a power transmission period and a non-power transmission period are alternately repeated. In the power transmission period, the rectified voltage VCC output by the power receiving circuit 61 rises. When the rectified voltage VCC is higher than the determination voltage VST, the switch switches on and the rectified voltage VCC is applied to one end of the start capacitor. In the non-power transmission period, when the rectified voltage VCC becomes lower than the determination voltage VST, the switch switches off, the electrical charge is discharged from the start capacitor through the resistor, and the voltage at one end of the start capacitor decreases. When again in a power transmission period, the rectified voltage VCC becomes higher than the determination voltage VST, the switch switches on, and the rectified voltage VCC is applied to one end of the start capacitor.

When the power receiving device 40 is removed from the power transmission device 10, the rectified voltage VCC does not become higher than the determination voltage VST, so the voltage at one end of the start capacitor decreases. When the voltage at one end of the start capacitor drops below a removal determination voltage VT, the charging-system control circuit 63 writes that information in the register 76. When that information is written in the register 76, the discharging-system control circuit 73 changes the power supply control signal from a low level signal to a high level signal, and causes the power supply circuit 71 to start supplying power to the processing device 100. A period from the time when the voltage at one end of the start capacitor becomes lower than the determination voltage VST to the time when that voltage becomes equal to or less than the removal voltage VT is set as a predetermined period TST. The predetermined period TST is set to be longer than the period during which power transmission is stopped in intermittent power transmission, so power supply is not started before the power receiving device 40 is removed from the power transmission device 10.

Figure 10:
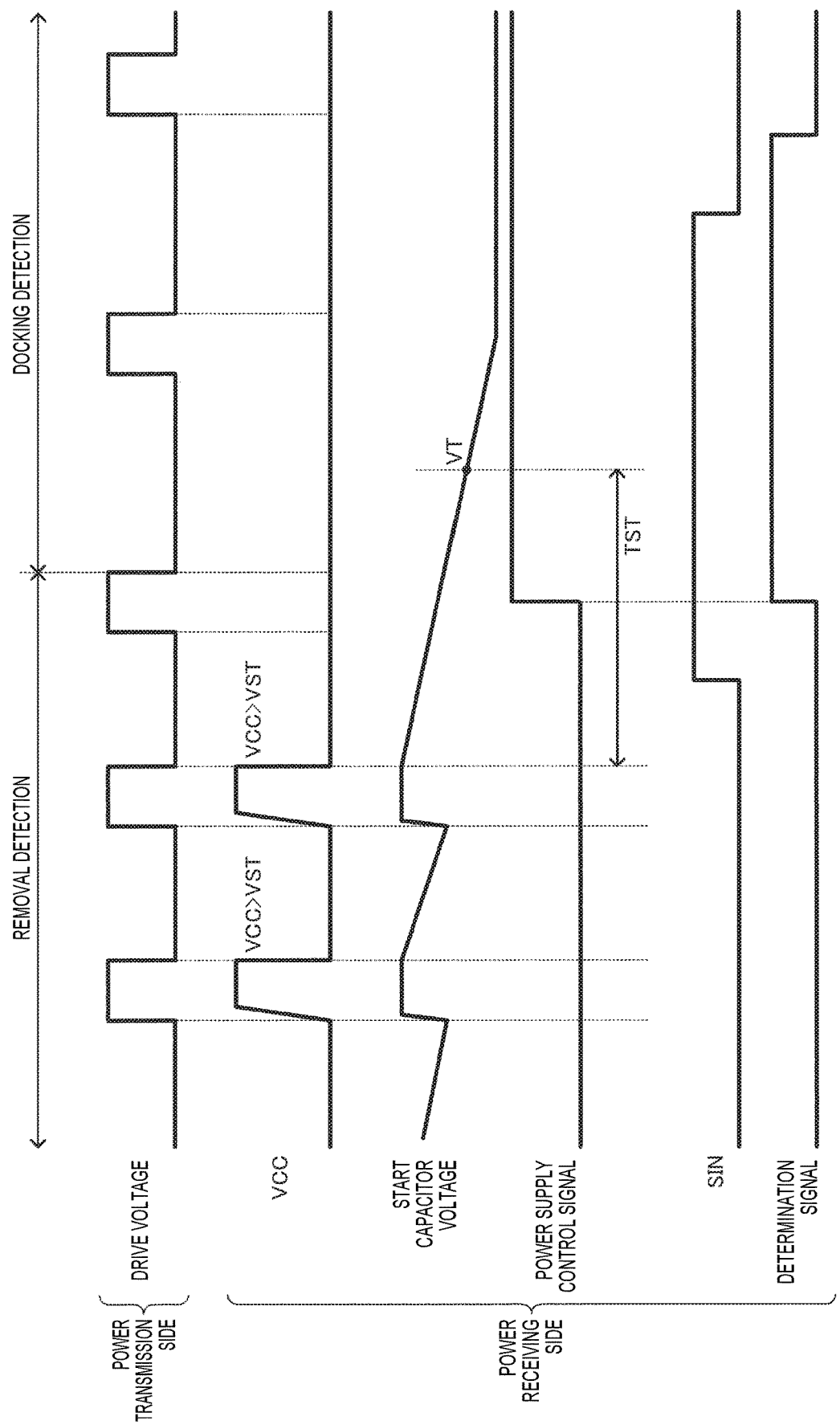
FIG. 10 is a timing chart illustrating a third operation example of the contactless power transmission system.

FIG. 10 is a timing chart illustrating a third operation example of the contactless power transmission system 200.

In FIG. 10, in the predetermined period TST, the motion sensor 110 detects motion and the detection signal SIN changes from a low level signal to a high level signal. In this case, the discharging-system control circuit 73 changes the determination signal from a low level signal to a high level signal, and changes the power supply control signal from a low level signal to a high level signal even within the predetermined period TST.

In the above embodiment, as described with reference to FIG. 9, when the charging-system circuit 60 detects removal after the predetermined period TST has passed after the power receiving device 40 is removed from the power transmission device 10, the discharging-system control circuit 73 switches the power supply to the on state. This control is called a sixth control. When motion of the power receiving device 40 has been detected by the motion sensor 110 during the predetermined period TST, the discharging-system control circuit 73 switches the power supply to the on state by the first control even if the predetermined period TST has not passed. The first control is switching control to switch the power supply to the on state based on the detection signal SIN from motion sensor 110.

During removal detection, the electronic device is powered on when the user removes the electronic receiving device on the power receiving side from the charger. That is, when the electronic device moves during removal detection, there is a high possibility that the user is attempting to remove the electronic device from the charger. In this embodiment, the power supply is switched to the on state after waiting for the predetermined period TST to pass, and the predetermined period TST is the waiting time from removal until the electronic device is powered on. When the motion sensor 110 detects motion in this predetermined period TST, the power supply is switched on without waiting for passage of the predetermined period TST, and thus the electronic device can be quickly powered on after removal.

Note that although this embodiment has been described in detail above, it will be easily understood by those skilled in the art that many modifications that do not substantially deviate from novel matters and effects of the invention are possible. Accordingly, all such modifications are encompassed by the invention. For example, in the specification or the drawings, a term described at least once together with a different term having a broader or equivalent meaning can be replaced with the different term at any point in the specification or the drawings. Also, all combinations of this embodiment and modifications are encompassed by the invention. Also, the configuration, operation, and the like of the control device on the power receiving side, the power receiving device, the control device on the power transmission side, the power transmission device, the contactless power transmission system, and the electronic device are not limited to those described in this embodiment, and various modified embodiments are possible.

What is claimed is:

1. A control device for controlling a power receiving device that receives electric power supplied from a power transmission device by contactless power transmission, the control device comprising:

a charging-system circuit configured to receive electric power supplied from the power transmission device, and charge a charging subject based on the received electric power; and a discharging-system circuit having:
  a discharging-system control circuit configured to operate based on electric power from the charging subject; and
  a power supply circuit configured to perform power supply to a processing device based on electric power from the charging subject, the discharging-system control circuit being configured to:
    perform a first control that, when the power supply circuit is in an off state and motion of the power receiving device is detected by a motion sensor that detects motion of the power receiving device, switches the power supply circuit to an on state based on a detection signal from the motion sensor,
    perform a second control of switching the power supply circuit between the on state and the off state based on a first control signal that controls switching of the power supply circuit between the on state and the off state, and
    in the first control, disable the second control when motion of the power receiving device has been detected by the motion sensor.

2. The control device according to claim 1,
wherein the discharging-system circuit has a monitoring circuit configured to monitor an operation state of a switch unit, and output a monitoring result as the first control signal, and
the discharging-system control circuit is configured to, in the second control, when the power supply circuit is in the off state and the monitoring circuit detects operation of the switch unit, switch the power supply circuit to the on state based on the first control signal, and when the power supply circuit is in the on state and the monitoring circuit detects operation of the switch unit, switch the power supply circuit to the off state based on the first control signal.

3. The power receiving device, comprising:
the control device according to claim 2.

4. An electronic device, comprising:
the control device according to claim 2.

5. The control device according to claim 1, wherein the discharging-system control circuit is configured to:
  perform a third control that maintains the power supply circuit in the off state based on a second control signal that maintains the power supply circuit in the off state; and
  in the third control, disable the first control even if motion of the power receiving device has been detected by the motion sensor.

6. The control device according to claim 5, further comprising:
a voltage detection circuit,
wherein the power supply circuit, where VBAT represents a voltage of the charging subject and k is a real number that satisfies 0<k<1, is configured to output a voltage of k×VBAT from an output node to the processing device,
the voltage detection circuit, where VOUT represents a voltage of the output node and p is a real number that satisfies p>1, is configured to detect whether or not VOUT>p×k×VBAT is satisfied, and output a detection result as the second control signal, and the discharging-system control circuit is configured to, in the third control, when the voltage detection circuit detects that VOUT>p×k×VBAT is satisfied, switch the power supply circuit from the on state to the off state based on the second control signal, and maintain the off state.

7. The power receiving device, comprising:
the control device according to claim 6.

8. An electronic device, comprising:
the control device according to claim 6.

9. The power receiving device, comprising:
the control device according to claim 5.

10. An electronic device, comprising:
the control device according to claim 5.

11. The control device according to claim 1, wherein the discharging-system control circuit is configured to:
  perform a fourth control that, when the charging-system circuit is charging the charging subject, sets the power supply circuit to the off state; and
  in the fourth control, disable the first control even if motion of the power receiving device has been detected by the motion sensor.

12. The power receiving device, comprising:
the control device according to claim 1.

13. The control device according to claim 1, wherein the discharging-system control circuit is configured to:
  perform a fifth control that, when the charging-system circuit is performing removal detection that detects whether the power receiving device has been removed from the power transmission device, sets the power supply circuit to the off state; and
  in the fifth control, disable the first control even if motion of the power receiving device has been detected by the motion sensor.

14. The control device according to claim 13, wherein the discharging-system control circuit is configured to:
  perform a sixth control that, when the charging-system circuit detects removal after a predetermined period has passed after the power receiving device is removed from the power transmission device, switches the power supply circuit to the on state, and
  in the sixth control, when motion of the power receiving device has been detected by the motion sensor during the predetermined period, switch the power supply circuit to the on state by the first control even if the predetermined period has not passed.

15. The power receiving device, comprising:
the control device according to claim 14.

16. The power receiving device, comprising:
the control device according to claim 13.

17. The control device according to claim 1, further comprising:
an interface circuit that receives a power off command that sets the power supply circuit to the off state from the processing device,
wherein the discharging-system circuit has a monitoring circuit configured to monitor an operation state of a switch unit, and output a monitoring result as the first control signal, and
the discharging-system control circuit is configured to:
  perform a seventh control that switches the power supply circuit from the on state to the off state when the interface circuit receives the power off command, and
  if performing the processing of the second control, stop that processing and enables-enable the seventh control.

18. The power receiving device, comprising:
the control device according to claim 17.
19. The power receiving device, comprising:
the control device according to claim 1.
20. An electronic device, comprising:
the control device according to claim 1.

* * * * *